United States Patent [19]
Yamaguchi et al.

[11] Patent Number: 5,257,138
[45] Date of Patent: Oct. 26, 1993

[54] OPTICAL UNIT FOR USE IN AN IMAGE FORMING APPARATUS

[75] Inventors: Masao Yamaguchi, Kawaguchi; Ken Omura, Tokyo; Kimiaki Furukawa, Tokyo; Yutaka Yoshida, Tokyo, all of Japan

[73] Assignee: Kabushiki Kaisha Toshiba, Kawasaki, Japan

[21] Appl. No.: 907,530

[22] Filed: Jul. 2, 1992

[30] Foreign Application Priority Data

Jul. 4, 1991 [JP]  Japan ................................ 3-164509

[51] Int. Cl.$^5$ .............................................. G02B 7/02
[52] U.S. Cl. ................................. 359/819; 359/217; 346/108
[58] Field of Search ............... 359/819, 820, 216, 217, 359/218, 219; 346/108, 160

[56] References Cited
U.S. PATENT DOCUMENTS

| | | | |
|---|---|---|---|
| 4,731,623 | 3/1988 | Oda et al. | 346/160 |
| 4,868,673 | 9/1989 | Negoro | 346/108 |
| 4,977,412 | 12/1990 | Komori et al. | 346/108 |
| 5,111,340 | 5/1992 | Kashima et al. | 359/819 |
| 5,157,536 | 10/1992 | Uematsu | 359/217 |

*Primary Examiner*—Loha Ben
*Attorney, Agent, or Firm*—Foley & Lardner

[57] ABSTRACT

In an optical unit of the present invention, a laser element and a glass lens are contained in a lens barrel. The ray axis of the laser beam is aligned with the optical axis of the glass lens without accidental displacement. By surely fixing the lens barrel, shift of the lens along the optical axis or variation in distance between the lens and laser element can be prevented. In contrast, a manufacturing precision of a lens barrel holding member may be lowered and low-in-cost. In order to ensure exact fixing of the lens barrel, a leaf-spring and a bonding agent are used. In this case, it is desirable that the force per unit contact length exerted by the leaf-spring onto the lens barrel be in the range of $100<F<400$ [gf/mm]. The amount of the bonding agent is determined so as to be sufficient for fixing the lens barrel and to prevent flowing-out of the bonding agent and an increase in time for drying.

9 Claims, 8 Drawing Sheets

OPTICAL UNIT FOR USE IN AN IMAGE FORMING APPARATUS

BACKGROUND OF THE INVENTION

1. Field of the Invention

This invention relates to an optical unit for use in an image forming apparatus, more specifically, an optical unit for guiding a light beam from a laser element to a recording medium via a group of lenses and an optical deflector.

2. Description of the Related Art

An image forming apparatus represented by a laser beam printer apparatus includes an optical unit for supplying a laser beam having a desired beam spot size to a recording medium.

In the optical unit, a light beam emitted from a laser element serving as a light source is converted through a first optical system to a parallel beam or a convergent beam having a desired beam spot size. The light beam with the desired beam spot size is deflected by an optical deflector. The beam spot size of the deflected light beam is adjusted by a second optical system to a beam spot size suitable for use in a printer apparatus, and the light beam is focused on the recording medium.

The first optical system has, in combination, an aspherical glass lens, plastic lens, etc., for changing the beam spot size of the light beam traveling from the laser to the deflector to a desired size. The aspherical glass lens and plastic lens are integrally assembled via a support member such as a lens barrel. The deflector has a reflecting mirror(s) or polygonal mirror which has a flat surface or curved surface and is rotated by a motor, etc. The second optical system includes an fθ lens for making the rotation angle of the mirror proportional to the distance from the optical axis center in the main scan direction of the light beam focused on the recording medium or photoconductor, with respect to the light beam traveling from the optical deflector to the photoconductor.

In the optical unit, in order to keep an optimum beam spot size of the light beam traveling from the laser to the deflector, at least one of the lenses of the first optical system is designed to be movable along the optical axis. In this case, the movable lens is moved along the optical axis, thereby maintaining an optimum beam spot size.

There is a case where at least one lens (a glass lens in general) of the first optical system and the laser element are arranged integrally via a lens barrel. In this case, the beam spot size of the light beam is not easily affected by a variation in temperature or humidity.

On the other hand, the lens barrel is generally secured, via a leaf spring and screw, to a holding member for securing the base or lens barrel of the optical unit.

However, since at least one lens (or lens barrel) of the first optical system is movable, the position of the lens (in particular the lens barrel) may be displaced when slight vibration or shock acts on either the lens barrel or optical unit or when the printer apparatus is moved roughly. This poses a serious problem in maintaining the optimal beam spot size.

Even where the lens barrel (lens) is fixed, for example, to the leaf spring by an adhesive, if the urging force of the leaf spring upon the lens barrel is strong, the lens barrel may be displaced by the urging force of the leaf spring. In addition, when the amount of the adhesive is small, the lens barrel may easily be affected by vibration or shock.

The displacement of the fixed lens (in particular the lens barrel) causes, for example, a decrease in resolution of output characters or figures, deformation of characters or distortion of figures, when the optical unit is built in the printer apparatus. In addition, when the position of the lens barrel is displaced, the optical unit, in usual cases, must be re-assembled by using many checking devices. As a result, the printer apparatus cannot be used for a long time. In the case where the optical unit is replaced, instead of re-assembling the optical unit, the cost of outputs (hard copies) obtained by the printer apparatus increases remarkably since the optical unit is very expensive.

SUMMARY OF THE INVENTION

An object of the present invention is to provide an optical unit having a high resistance to vibration and shock.

Another object of the invention is to provide an optical unit capable of being easily assembled with high precision of assembly.

Another object of the invention is to provide a printer apparatus having a high resistance to vibration and shock, and being easily movable, with less deformation of characters, less distortion of figures and a less decrease in resolution.

Still another object of the invention is to provide a printer apparatus with less deterioration of image quality of a printed-out hard copy, thereby reducing running costs.

According to an aspect of the invention, there is provided an optical unit comprising:

means for converting a beam spot size of a light beam emitted from a light source to a predetermined beam spot size;

means, having a vertical reference surface, for holding the converting means;

means for urging the converting means onto the vertical reference surface of the holding means in one direction; and means, put on a region between the converting means and the reference surface of the holding means above a contact point between the converting means and the reference surface, for bonding the converting means and the holding means, wherein the condition, $100 < F < 400$, is satisfied, where F [gf/mm] is the urging force per unit contact length by which the urging means urges the converting means.

According to another aspect of the invention, there is provided an optical unit for use in an image forming apparatus, comprising:

a light source for emitting a light beam;

means, having an optical axis, for converting a beam spot size of the light beam from the light source to a predetermined beam spot size;

means, having a vertical reference surface on which the converting means is urged, for movably supporting the converting means so that the optical axis of the converting means may be aligned with the ray axis of the optical path of the light beam from the light source;

means for pressing the converting means onto the vertical reference surface of the supporting means, in the state in which the ray axis is aligned with the optical axis; and means, put on a region between the converting means and the reference surface of the supporting means above a contact point between the converting means and the reference surface, for bonding the converting means and the supporting means, wherein the condition expressed by $$100 < F < 400,$$

and $$2.76 \times 10^{-5} < t/l \{\sin \phi - (\lambda) \sin 2\phi - \pi \phi/360\} < 0.21,$$

is satisfied, where $F$ [gf/mm] is the urging force per unit contact length by which the pressing means urges the converting means, $\phi$ is the angle [°] defined in the plane perpendicular to the optical axis of the converting means by a line connecting a point on the optical axis and a contact point between the reference surface and the converting means and a line connecting the point on the optical axis and a point on an end portion of the bonding means, $l$ is the axial length [mm] of the converting means along the optical axis, and $t$ is the length of the bonding means applied along the longitudinal axis of the converting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
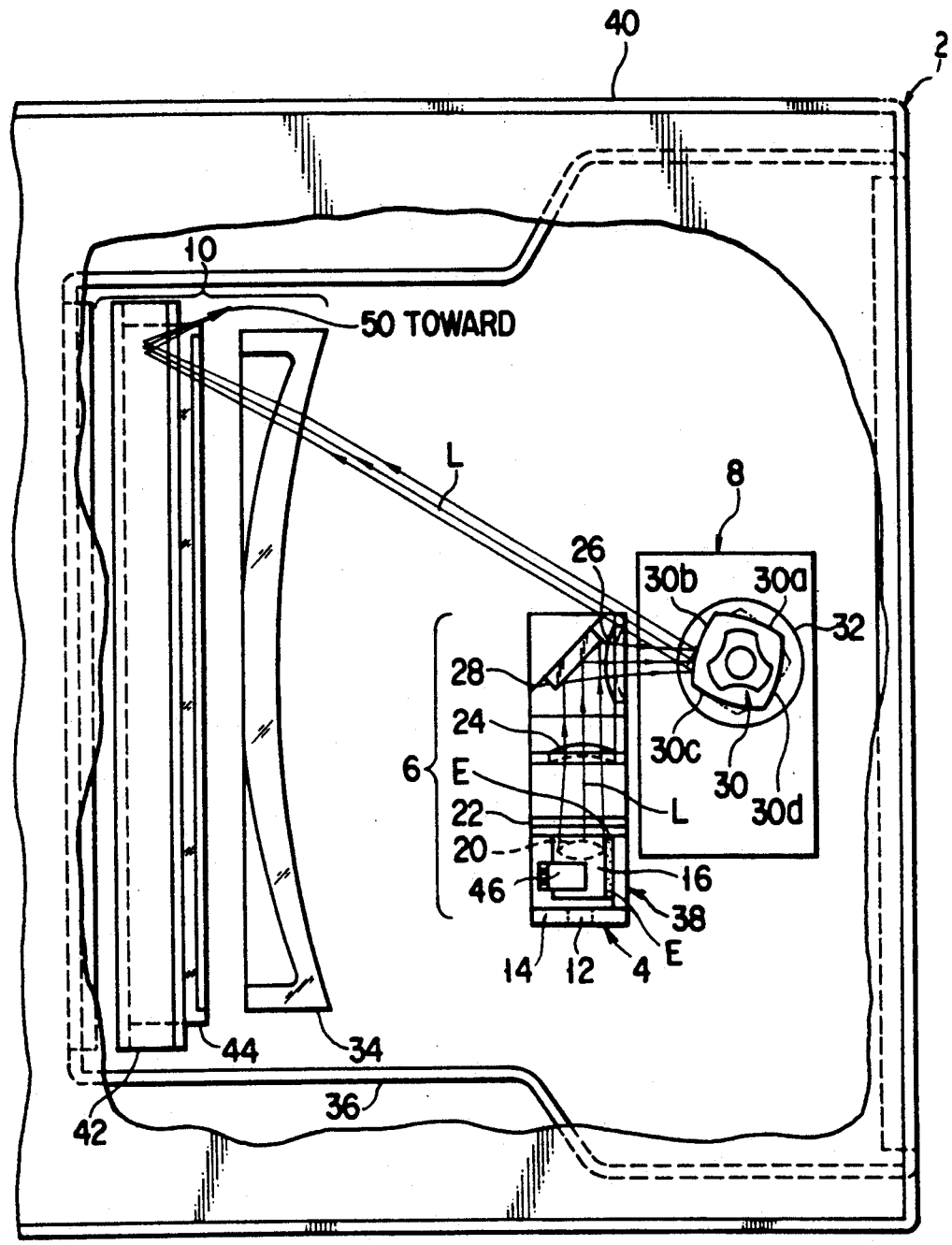
FIG. 1 is a schematic plan view showing an optical unit for use in a printer apparatus, according to an embodiment of the present invention.
Figure 2A:
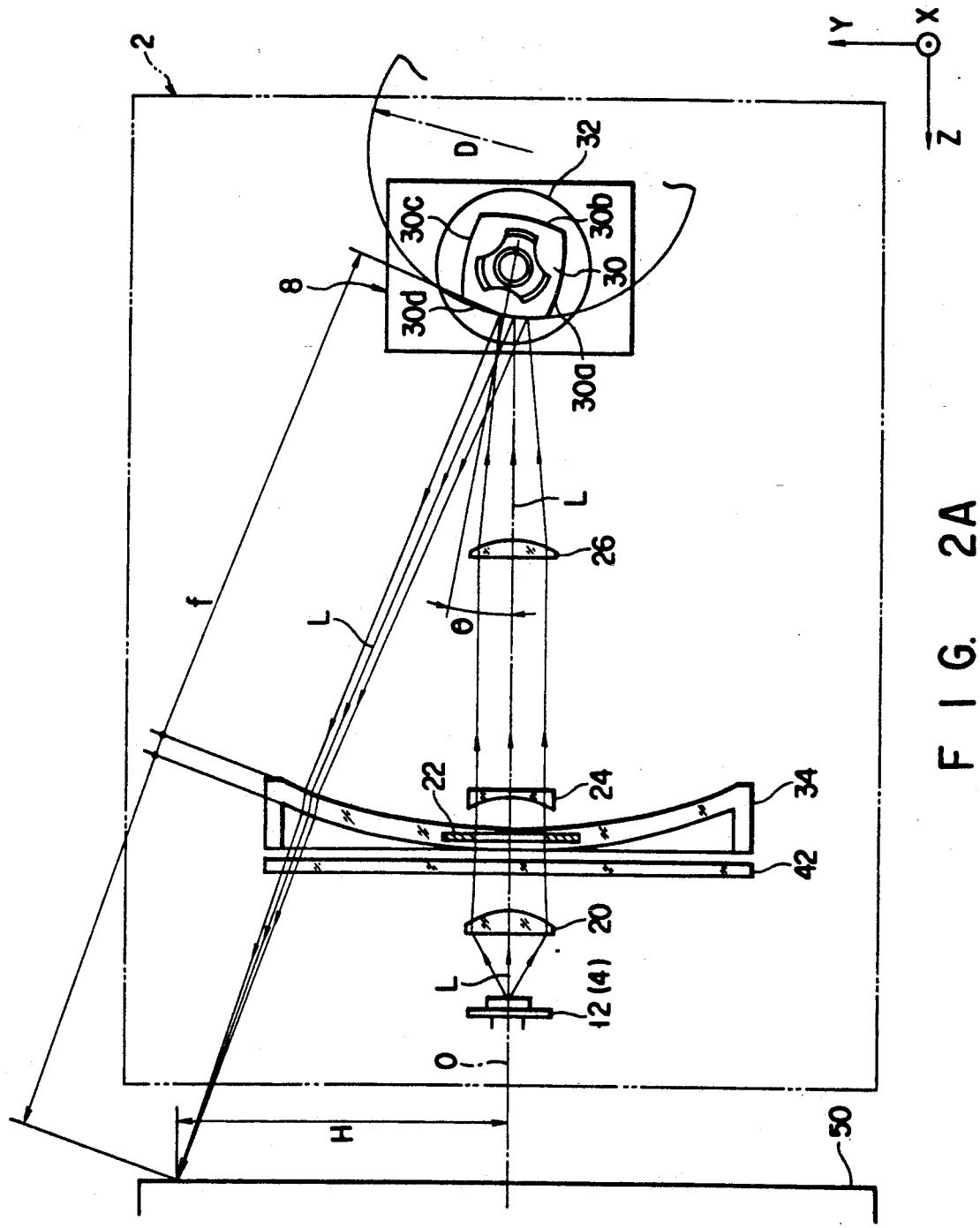
FIG. 2A is a schematic view showing an optical path of a light beam traveling from a light source to a reflecting mirror, in the optical unit shown in FIG. 1.
Figure 2B:
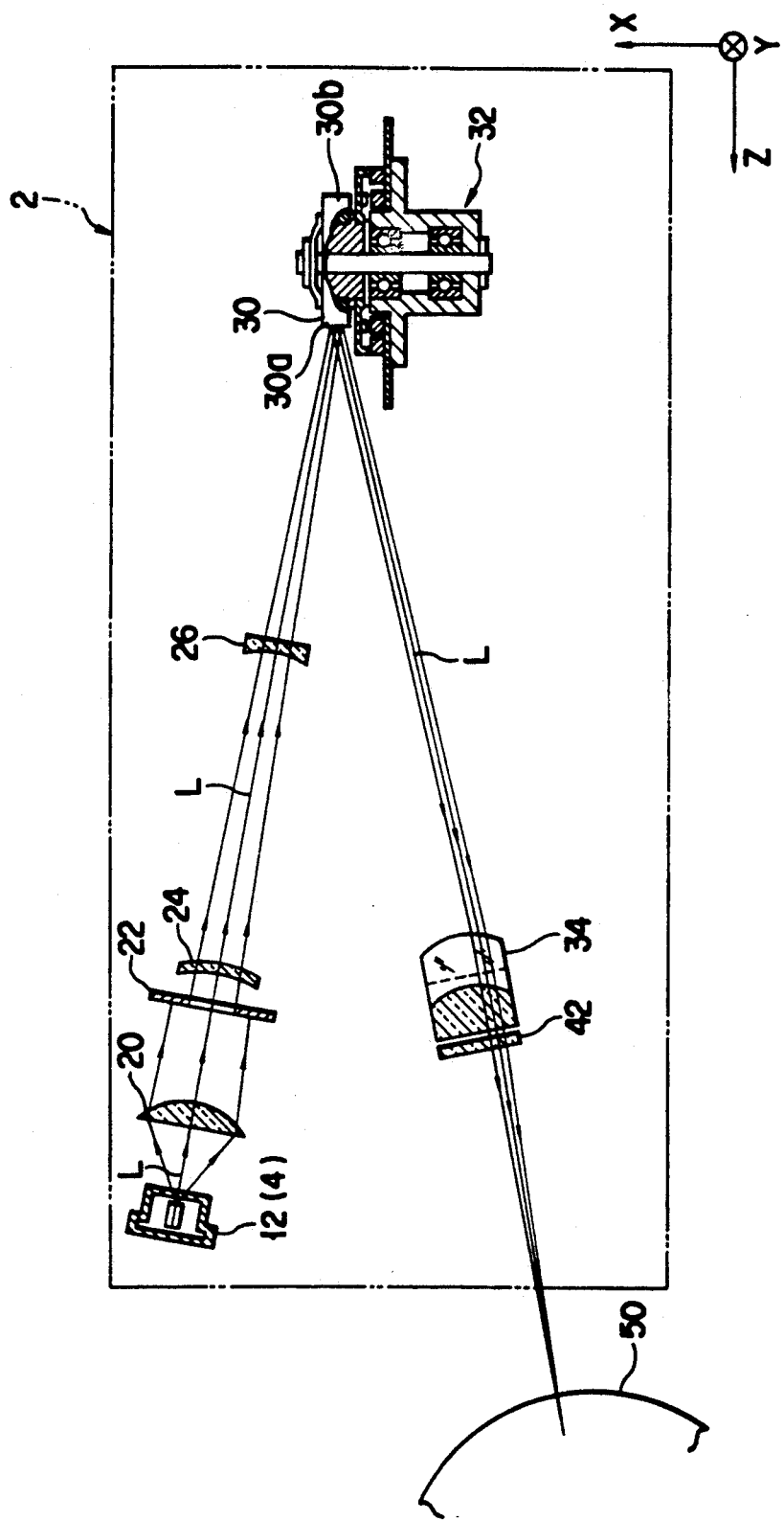
FIG. 2B is a schematic view showing an optical path of a light beam traveling from the reflecting mirror shown in FIG. 2A to a recording medium, in the optical unit shown in FIG. 1.

According to FIGS. 1 to 2B, an optical unit 2 includes a light source 4 for generating a laser beam L and optical elements for guiding the laser beam L towards an object. These optical elements are arranged successively following the light source 4 in a direction in which a laser beam travels. The optical elements are, typically, a first optical system 6 for determining the beam spot size of the laser beam L from the light source 4 to a desired value, an optical deflector 8 for deflecting the laser beam L from the first optical system 6, and a second optical system 10 for adjusting the beam spot size of the laser beam L deflected by the optical deflector 8 to a desired size suitable for an image forming apparatus (not shown).

The light source 4 includes a semiconductor laser element (hereinafter referred to as "laser") 12, and a laser holder 14 for holding the laser 12 such that the laser 12 is lightly movable in a direction perpendicular to the ray axis of the laser beam L generated by the laser 12. The laser 12 is mounted on a hole of the laser holder 14, and a bonding agent (an epoxy bond) is poured between the laser 12 and the hole of the holder 14. The laser holder 14 is fixed to a lens holding member 38 (described later) by screws.

The first optical system 6 is situated in the closest position to the laser 12. The first optical system 6 includes a glass lens 20 (lens-number 1) for providing the laser beam L with a convergence property, an aperture stop 22, situated next to the glass lens 20, for keeping the intensity of the laser beam L at a substantially constant value and for conditioning the beam spot size of the laser beam L to a predetermined form, a first plastic lens 24 (lens-number 2) and a second plastic lens 26 (lens-number 3) situated in rear of the stop 22 in series.

The glass lens 20 is an aspherical lens, formed of an optical glass such as BK7 or SK10, for converting the laser beam L to a convergent beam or a parallel beam.

The first and second plastic lenses 24 and 26 provide the laser beam L, which has passed through the aperture stop 22, with a desired convergence property.

The lens 24 is formed of, e.g., a resin such as PMMA (polymethylmethacrylate). The lens 24 has a toric surface having a negative power with respect to a direction (main scanning direction) including a deflection plane of the laser beam L, which is deflected by the rotation of a polygonal mirror 30 of an optical deflector 8, and having a slightly positive power in a sub scanning direction perpendicular to the main scanning direction.

The first plastic lens 24 is adhered to a lens holding member 38. The lens 24 is provided with a plate-like flange portion (not shown) by which the lens 24 is exactly fixed to a desired position on the lens holding member 38. A lower part (bottom surface) of the flange portion is provided with a projection 24p (shown in FIG. 3) for precisely determining the fixing position between the lens 24 and the lens holding member 38. The projection 24p is fitted in a recess 38b (shown in FIG. 3) formed in the lens holding member 38, whereby the lens 24 is precisely fixed at desired position of the lens holding member 38. The combination of the projection 24p of the lens 24 and the recess 38b of the lens holding member 38 reduces the fixing error of the lens 24 to about 200 [μm] or less. This makes it unnecessary to adjust the position of the lens 24 (optical axis adjustment) to align the predetermined optical axis of the lens 24 with the ray axis of the laser beam L which passes through the lens 24.

Like the lens 24, the second plastic lens 26 is made of PMMA or the like. The lens 26 has a toric surface having a positive power in the main scanning direction and a negative power in the sub scanning direction.

The lens 26, like the lens 24, is adhered to the lens holding member 38. In addition, the lens 26 is provided with a flange portion (not shown) by which the lens 26 is precisely fixed to a desired position on the holding member 38. A lower part (bottom surface) of the flange portion is provided with a projection 26p (shown in FIG. 3) for precisely determining the fixing position between the lens 26 and the lens holding member 38. The projection 26p is fitted in a recess 38c (shown in FIG. 3) formed in the lens holding member 38, whereby the lens 26 is precisely fixed at a desired position of the lens holding member 38.

Similarly with the lens 24, the combination of the projection 26p of the lens 26 and the recess 38c of the lens holding member 38 reduces the fixing error of the lens 26 to about 200 [μm] or less. This makes it unnecessary to adjust the position of the lens 26 (optical axis adjustment) to align the predetermined optical axis of the lens 26 with the ray axis of the laser beam L which passes through the lens 26.

A mirror 28 for turning the optical path of the laser beam L traveling towards the optical deflector 8 is situated between the first plastic lens 24 and the second plastic lens 26.

The optical deflector 8 includes a polygonal mirror 30, has four reflecting surfaces 30a, 30b, 30c and 30d, and a motor 32 for rotating the polygonal mirror 30 at a desired speed. Each surface of the reflecting surfaces 30a–30d of the polygonal mirror 30 is convexed in the direction in which the laser beam L advances (i.e., a cylindrical curved surface defined by a radius D shown in FIG. 2A). The surfaces 30a–30d reflect the laser beam L successively in accordance with the angle of rotation. Note that the successively reflect is called "deflect".

The second optical system 10 has a third plastic lens 34 (lens-number 4) for focusing the laser beam L deflected by the optical deflector 8 on a desired position on a photoconductor 50 or a recording medium (object) linearly.

The lens 34 is provided with such a power in the main scanning direction as to obtain a focal length f for making the angle ½ at which each of mirror surfaces 30a–30d of the polygonal mirror 30 is rotated proportional to the distance H over which the laser beam L deflects towards the photoconductor 50 in the main scanning direction from the center of the optical axis. That is, the lens 34 is provided with such a power as to meet $H = f\theta$ (see FIG. 2A). In addition, the lens 34 has a power in the sub scanning direction, which gradually decreases in accordance with the increase in H (or $\theta$) in the main scanning direction.

The third plastic lens 34 can reduce a field curve and set distortion at a suitable level in the main scanning direction, in the state wherein the laser beam L reflected by the polygonal mirror 30 is guided to the photoconductor 50. In the sub scanning direction, the lens 34 can reduce movement of the laser beam L (i.e., face inclination in the rotational direction of the photoconductor 50) on the photoconductor 50, which is due to the magnitude of inclination of each of surfaces 30a to 30d.

The light source 4, first and second optical systems 6 and 10 and optical deflector 8 are contained within an outer member 36 as one body.

The lens holding member 38 for holding the lens barrel 16 is fixed to the outer member 36. As has been described above, the lens holding member 38 holds the aperture stop 22, first plastic lens 24 and second plastic lens 26 as one body. The outer member 36 is hermetically sealed, as optical unit 2, from the outside by a top cover 40 which constitutes a part of the frame of the image forming apparatus (not shown) in which the optical unit 2 is built. The outer member 36 is provided with a cover plate 42 for hermetically sealing the optical unit 2 from the outside. The cover plate 42 is formed of a transparent material capable of transmitting the laser beam L with no attenuation, and situated in a region where the laser beam L traveling from the lens 34 toward the photoconductor 50 intersects the outer member 36. A mirror 44 for turning the laser beam L traveling towards the photoconductor 50 is situated between the cover plate 42 and third plastic lens 34, thereby reducing the size of the optical unit 2.

A monitoring device (not shown) for monitoring horizontal synchronism of the laser beam L guided towards the photoconductor is built in the optical unit 2.

Figure 3:
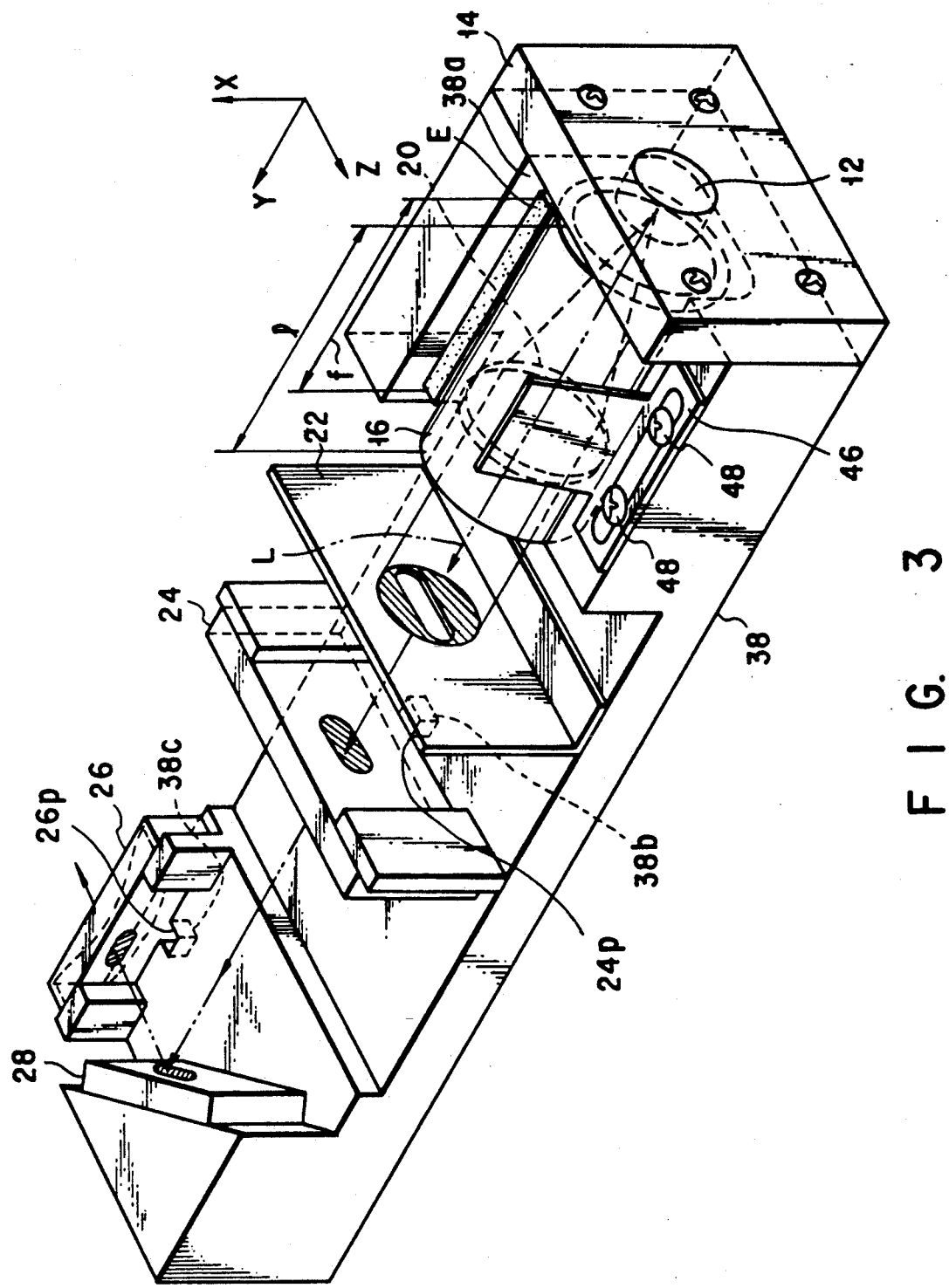
FIG. 3 is an enlarged view showing peripheral parts of a laser element, a glass lens and a lens barrel in the optical unit shown in FIG. 1.

Referring to FIG. 3, the glass lens 20 is held by the cylindrical lens barrel 16. The lens barrel 16 is urged on a vertical wall 38a of the lens holding member 38 in one direction by the lens barrel stopper 46. The wall 38a is precisely machined so as to cancel a "vertical difference in the fixing position in a plane perpendicular to the optical axis of the lens 20", i.e., a displacement between the ray axis of the laser beam L emitted from the laser 12 towards the lens 26 and the optical axis of the grass lens 20 (after called "vertical difference of the lens 20") mentioned below, when the lens barrel 16 is urged. By contrast, the machining precision for the lens holding member 38 may be lowered, compared to conventional holding members (it suffices if only the machining precision for the wall 38a is high). The stopper 46 is made of an elastic material (e.g., a copper plate, phosphor bronze for a spring, stainless steel for a spring) and fixed to the lens holding member 38 by screws 48.

Regarding the glass lens 20 (lens barrel 16), the maximum allowance of the "vertical difference of the lens 20" is a) about several-ten [μm] with respect to the laser 12 and lens 20, b) about 200 [μm] with respect to the lens 20 and lens 24, and c) about 200 [μm] with respect to the lens 20 and lens 26.

On the other hand, the maximum allowance of a "horizontal difference in the fixing position of the lens 20 in the direction of the optical axis", i.e., the displacement of the laser beam L transmitted from the laser 12 to the photoconductor 50 (after called "horizontal difference") due to the variation in the size of the beam spot at the focusing position of the laser beam L, is about 2 to 3 [μm].

Accordingly, the lens barrel 16 must be fixed with high precision with respect to the direction in which the laser beam L travels from the laser 12 towards the photoconductor 50, the "horizontal difference" is included with the lens barrel 16.

While the lens barrel 16 is urged on the wall 38a, it is moved bit by bit along the optical axis of the lens 20 by means of, e.g., a special tool such as a micro-head mechanism (not shown) and is precisely fixed by the stopper 46 and screws 48.

Since the laser 12 (laser holder 14), while being attached to the lens holding member 38, is moved bit by bit in a direction perpendicular to the optical axis of the lens 20 by a special tool such as a micro-head mechanism (not shown), the optical axis of the glass lens 20 (lens barrel 16) coincides exactly with the ray axis of the laser beam L traveling from the laser 12 towards the photoconductor 50.

Accordingly, regarding the laser beam L traveling from the laser 12 towards the photoconductor 50, in the state wherein the spot size of the beam focused on the photoconductor 50 is kept at a desired value, the ray axis of the laser beam L traveling from the laser 12 towards the photoconductor 50 is made to coincide with the optical axis between the laser 12 and glass lens 20 and with the optical axis passing through the plastic lenses 24, 26 and 34 arranged between the glass lens 20 and photoconductor 50.

Thereafter, an ultraviolet hardening type adhesive agent (bonding agent, after called an UV bond) E, for example, is poured between the lens barrel 16 and the wall 38a of the lens holding member 38. (The bonding agent E may be put between the lens holding member 38 and the support 46.) Furthermore, the bonding agent E may be, for example, an epoxy bond.

Figure 4:
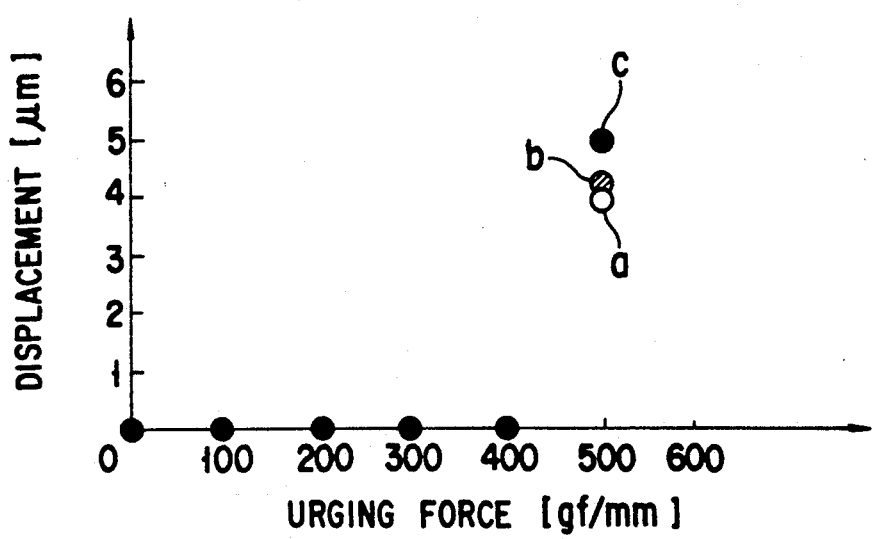
FIG. 4 is a graph showing the relationship between a force F [gf/mm] for urging the lens barrel shown in FIG. 3 and a displacement [μm]
Figure 5:
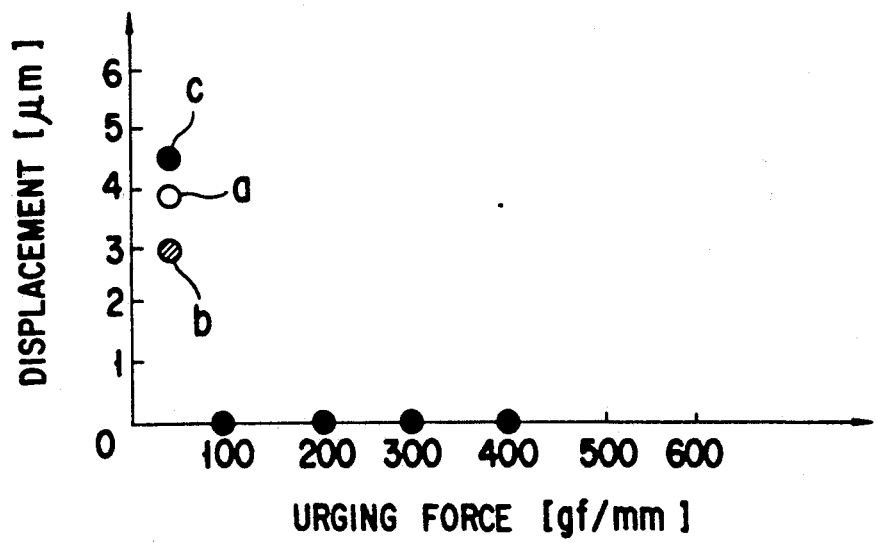
FIG. 5 is a graph showing a displacement [μm] of the lens barrel in the case where the optical unit is fallen while the force F [gf/mm] confirmed in FIG. 4 is maintained.

FIG. 4 shows the relationship between the force F [gf/mm] per unit contact length, which urges the lens barrel 16, and the displacement [μm] of the lens barrel 16. FIG. 5 shows the displacement [μm] in the case where the lens barrel 16 was fallen from the height of 10 [cm], while the urging force F ([gf/mm] per unit contact length) shown in FIG. 4 was maintained.

Now suppose that the vertical cross-sectional distance between the optical axis of the lens barrel 16 (glass lens 20) and the outer peripheral surface of the lens barrel 16, i.e., the outer peripheral radius of the lens barrel 16, is R [mm], and the length of the lens barrel 16 is l [mm]. The urging force F and the displacement of three lens barrels at the time of natural falling (barrel a : R=5, l=11; barrel b : R=5.6, l=11; barrel c : R=7, l=15) were examined. As is seen from FIG. 4, it was confirmed that when the urging force F exceeded 400 [gf/mm], a displacement of each of these barrels occurred.

According to FIG. 5, it was confirmed that when the urging force F falls below 100 [gf/mm], the displacements of the lens barrels occurred. The amount of the UV bond E is 2 [g] in each case. It is understood, from this, that the force F per unit contact length, by which the lens barrel stopper 46 urges the lens barrel 16, should desirably be in the range of 100 to 400 [gf/mm].

Figure 7:
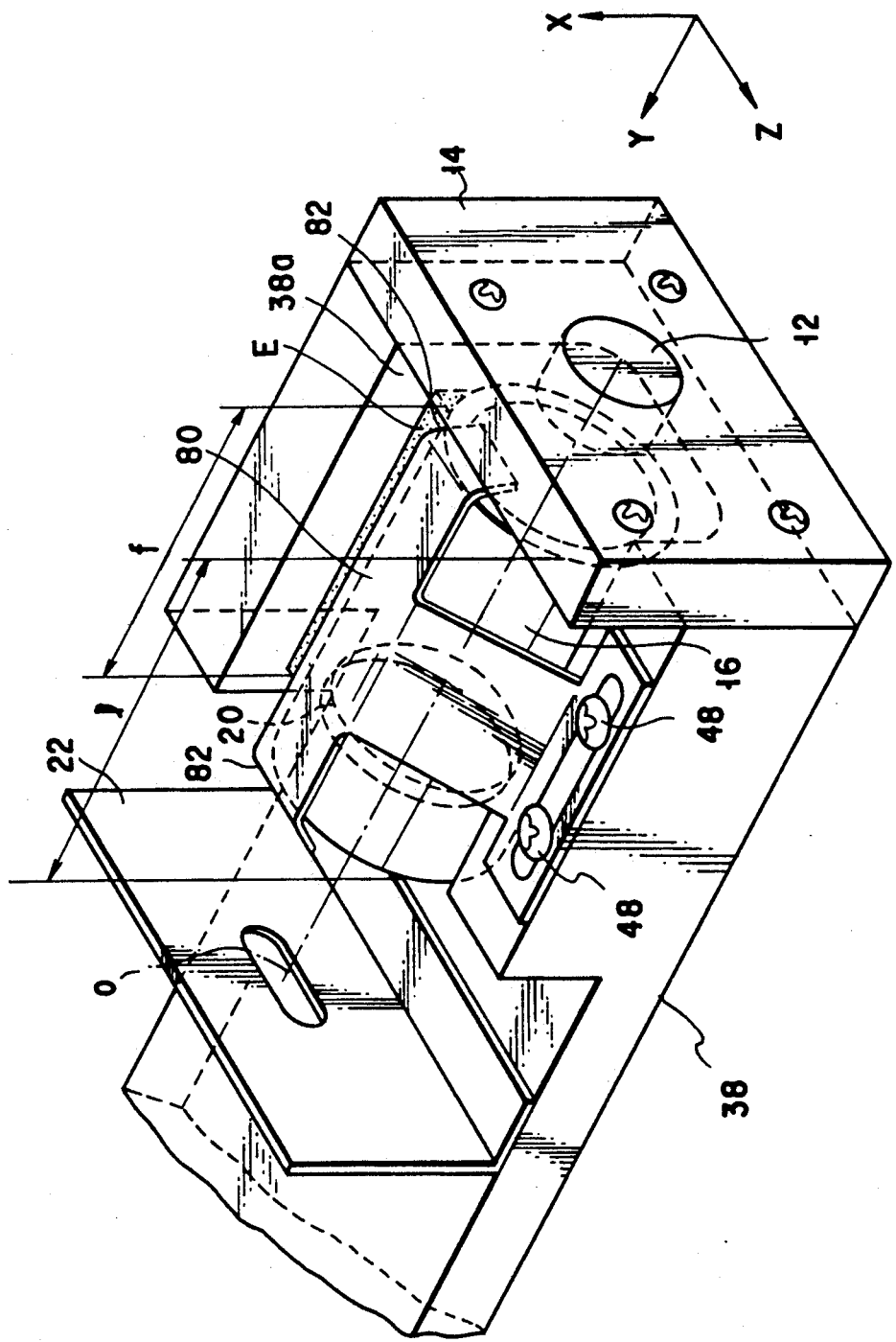
FIG. 7 is a schematic plan view showing a modification of a lens barrel stopper for fixing the lens barrel shown in FIG. 3.

A length t of applied bond E indicates the amount of the bond applied between the lens barrel 16 and the wall 38a of the lens holding member 38. As is shown in FIG. 3 or 7, the length of the bond E applied along the lens barrel 16 can be considered as one parameter.

The length t does not exceed the axial length l of the lens barrel 16. On the other hand, the minimum necessary amount of the bond E is t =l/4, [mm] in which case no displacement of the lens barrel 16 occurred in test of FIGS. 4 and 5. Accordingly, the length t of applied bond E is determined in the range of $\frac{1}{4} < t/l < 1$, in relation to the length l of the lens barrel 16. The t/l indicates the ratio of the length t of applied bond E to the length of the lens barrel 16.

Figure 6:
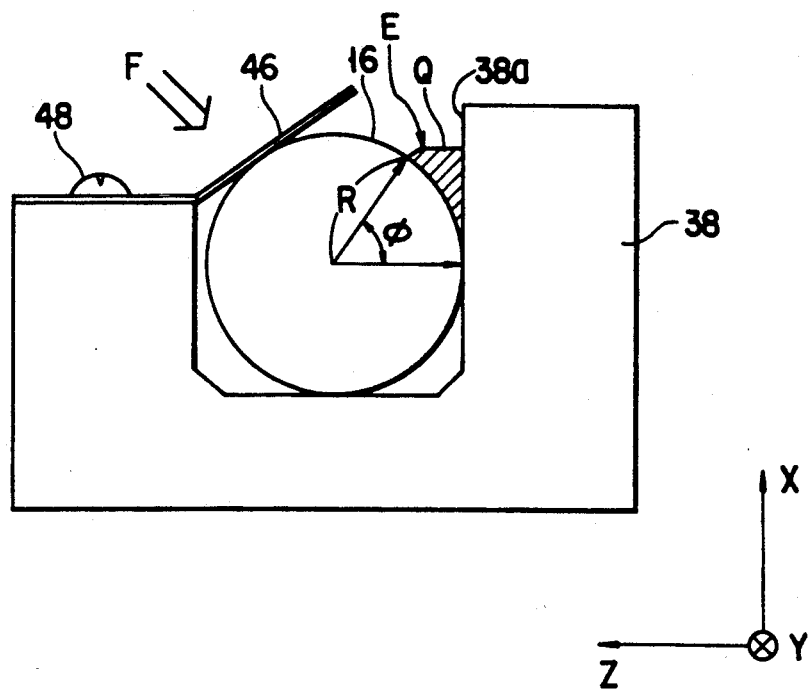
FIG. 6 is a vertical sectional view of the lens barrel shown in FIG. 3, as viewed in the direction of the optical axis.

FIG. 6 illustrates the most desirable condition of the UV bond E applied to the lens barrel 16.

Suppose that R is the outer peripheral radius [mm] of the lens barrel 16, $\phi$ is the angle defined by an imaginary line connecting the contact point between the wall 38a of the lens holding member and the lens barrel 16 and the optical axis of the glass lens 20 (lens barrel 16) and an imaginary line connecting the optical axis of the lens barrel 16 and the end portion of the UV bond E applied to the wall 38a, and Q is the vertical cross-sectional area of the epoxy bond E applied on the outer peripheral surface of the lens barrel 16 in direction parallel to the optical axis of the lens barrel 16. In this case, it was confirmed that the bonding efficiency was highest when the following condition was substantially satisfied:

$$Q = R^2 \{\sin\phi - (\tfrac{1}{4}) \sin 2\phi - \pi\phi/360\} \, [mm^2]$$

According to the experiment for the above confirmation, it is desirable that $\phi$ is 5 [°] or more. It was also confirmed, on the other hand, that when $\phi > 90[°]$, the time required for hardening of epoxy bond E is long, and the epoxy bond contracts or swells, while being hardened, due to ambient conditions. If the epoxy bond contracts or expands, it is possible that the lens barrel 16 may be displaced from the correct fixing position. Thus, it is desirable that $\phi$ is less than 90[°].

V is a parameter of total amount of epoxy bond E multiplied by $1/(R^2 l)$ is calculated as a product of the length t of applied bond E (mentioned before) and the cross-sectional area Q of epoxy bond E.

Accordingly, if the parameter V of the epoxy bond E is regarded as a function of the angle $\phi$ over which the bond E is applied, when $\phi = 5$ [°], $$t/l \, \{\sin 5 - (\sin 10)/4 - 5\pi/360\} = 2.76 \times 10^{-5},$$

and when $\phi = 90$ [°], $$t/l \, \{\sin 90 - (\sin 180)/4 - 90\pi/360\} = 0.21,$$

where t/l indicates the ratio of the length t of applied bond E to the length of the lens barrel.

Thus, the optimal amount parameter V of the epoxy bond E applied to the cylindrical lens barrel and the vertical wall 38a is $$2.76 \times 10^{-5} < t/l \, \{\sin\phi - (\tfrac{1}{4}) \sin 2\phi - \pi\phi/360\} < 0.21$$

By using the UV bond as defined above, the UV bond is prevented from flowing out, and can be hardened (dried) in a relatively short time. In addition, the lens barrel is not displaced by contraction of the epoxy bond which may occur due to hardening. Furthermore, sufficient resistance to vibration and shock can be obtained.

According to FIGS. 1 to 3, the laser beam L from the laser 12 is made incident on the glass lens 20. The laser beam L which has been converted to a convergent or parallel beam through the glass lens 20 is given a desired beam spot size via an aperture stop 22. The laser beam L traveling from the aperture stop 22 enters the first plastic lens 24. The laser beam L entering the first plastic lens 24 is converted to a parallel beam in the main scanning direction and to a convergent beam in the sub scanning direction, and guided to the second plastic lens 26. The laser beam L guided to the lens 26 is converted to a convergent beam in both of the main and sub scanning directions.

The laser beam L from the second plastic lens 26 is guided to the deflector 8 and deflected at a non-uniform angular velocity via the reflecting surfaces 30a, 30b, 30c and 30d.

The laser beam L deflected by the deflector 8 is made incident on the third plastic lens 34. The laser beam L which has passed through the lens 34 has a reduced waving or swinging characteristic and an adjusted characteristic so as to coincide with a predetermined straight line. This laser beam L is emitted towards the photoconductor 50. The laser beam L traveling towards the photoconductor 50 is once deflected via the mirror 44.

The laser beam L guided to the photoconductor 50 supplies information of characters or figures on the outer surface of the photoconductor 50. Accordingly, an electrostatic latent image is formed on the surface of the photoconductor 50.

Toner is applied to the electrostatic latent image through a developing device (not shown), and thus the latent image is visualized. Thereafter, the visualized image is output to a transferred material fed in advance.

When the laser beam L supplies information on the photoconductor 50, horizontal synchronism of part of the laser beam L, which has passed through the second optical system 10, is monitored by a monitoring device, each time the scanning in the main scanning direction (i.e., deflection of the laser beam L by the respective surfaces of the mirrors 30a to 30d) is performed.

Figure 8:
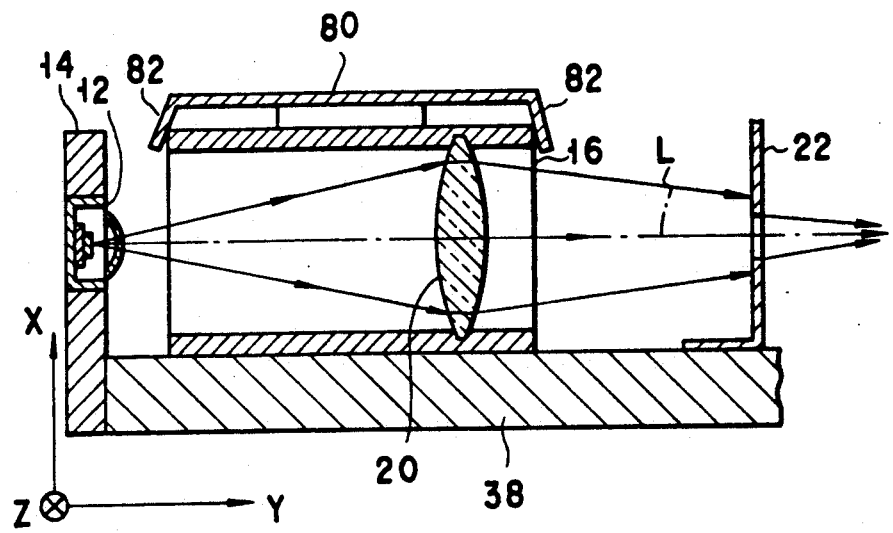
FIG. 8 is a side view showing the shape of the lens barrel stopper shown in FIG. 7.

FIGS. 7 and 8 show a modification of the lens barrel stopper for fixing the lens barrel 16.

A lens barrel stopper 80 has claw portions 82 extending in the longitudinal direction of the lens barrel 16. The stopper 80 is fixed to the lens holding member 38 by means of screws 48 (as with the stopper 46 shown in FIG. 3).

The distance between the claw portions 82 corresponds to the length of the lens barrel 16, and the claw portions 82 are provided with tapers. Accordingly, the lens barrel 16 can surely be clamped, and the thrust force in the longitudinal direction of the barrel 16 can be suppressed. The lens barrel 16 is exactly fixed to a desired position on the lens holding member 38 by the stopper 80. This ensures exact fixing of the lens barrel 16 even if the length of the lens barrel 16 is varied because of a reason relating to machining or a variation in temperature. Needless to say, like the above-described embodiment, UV bond (bonding agent) E is poured between the barrel 16 and the wall 38a of the lens holding member (see FIG. 7).

Figure 9:
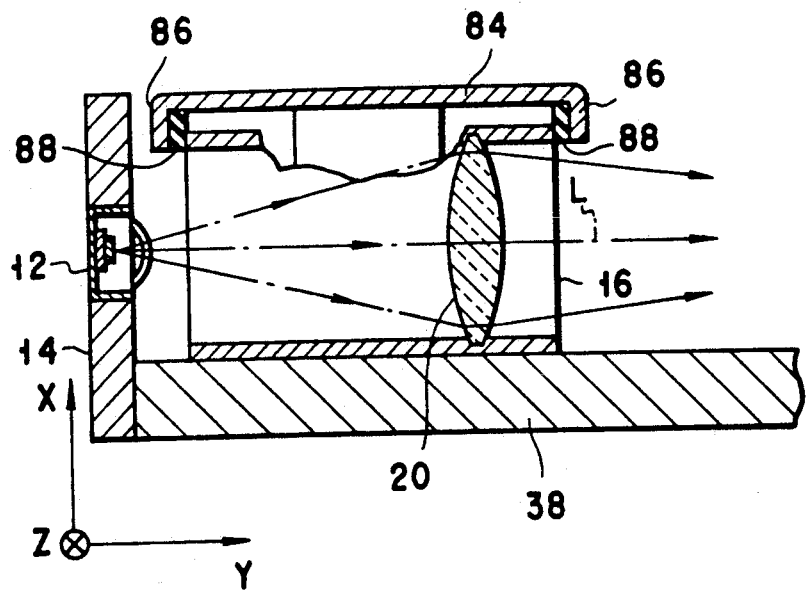
FIG. 9 is a schematic view showing another modification of the lens barrel stopper shown in FIGS. 7 and 8.

FIG. 9 shows another modification of the stopper.

Rubber members (pads) 88 are added to those portions of the claw portions 86 of the lens barrel stopper 84, which clamp the lens barrel 16. The thickness of each rubber pad 88 is slightly greater than the width of each of the two gaps between the claw portions 86 and the lens barrel 16. Thereby, the thrust of the lens barrel 16 in the longitudinal direction can be prevented. It is desirable that the rubber pads 88 have low elastic coefficients. As with the above-described embodiment and modification, UV bond E is put between the lens barrel 16 and the wall 38a of the lens holding member.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical unit comprising:
   means for converting a beam spot size of a light beam emitted from a light source to a predetermined beam spot size;
   means, having a vertical reference surface, for holding the converting means;
   means for urging the converting means onto the vertical reference surface of the holding means in one direction; and
   means, put on a region between the converting means and the reference surface of the holding means above a contact point between the converting means and the reference surface, for bonding the converting means and the holding means,
   wherein the condition, $100 < F < 400$, is satisfied, where F [gf/mm] is the urging force per unit contact length by which the urging means urges the converting means.

2. The unit according to claim 1, wherein said urging means is formed of one of a copper plate, phosphor bronze for a spring, and stainless steel for a spring.

3. The unit according to claim 2, wherein said urging means includes portions extended in the longitudinal direction of the converting means and bent towards both end portions of the converting means.

4. The unit according to claim 3, wherein said portions of the urging means have tapers tapering towards the converting means.

5. The unit according to claim 3, wherein a distance between said portions of the urging means is greater than the length of the converting means in the longitudinal direction of the converting means, and each of said portions of the urging means is provided with a pad having a thickness greater than the width of each of gaps defined between the surfaces of said portions of the urging means, which face the converting means, and the converting means.

6. The unit according to claim 1, wherein said bonding means has, desirably, such a property that the bonding means does not easily permeate between the converting means and the holding means.

7. The unit according to claim 6, wherein said bonding means satisfies the condition expressed by $$2.76 \times 10^{-5} < t/l \{\sin\phi - (\tfrac{1}{4}) \sin 2\phi - \pi\phi/360\} < 0.21,$$

where $\phi$ is the angle (°) defined in a plane perpendicular to the optical axis of the converting means by a line connecting a point on said optical axis and a contact point between the reference surface and the converting means, and a line connecting said point on said optical axis and a point on an end portion of the bonding means, where l is the axial length (mm) of the converting means along the optical axis, and t is the length of the bonding means applied along the longitudinal axis of the converting means.

8. The unit according to claim 6, wherein said bonding means contains, preferably, ultraviolet hardening type adhesive agents.

9. An optical unit for use in an image forming apparatus, comprising:
- a light source for emitting a light beam;
- means, having an optical axis, for converting a beam spot size of the light beam from the light source to a predetermined beam spot size;
- means, having a vertical reference surface on which the converting means is urged, for movably supporting the converting means, so that the optical axis of the converting means may be aligned with the ray axis of the optical path of the light beam from the light source;
- means for pressing the converting onto the vertical reference surface of the supporting means in the state in which the ray axis is aligned with the optical axis and
- means, in a region between the converting means and the reference surface of the supporting means above a contact point between the converting means and the reference surface, for bonding the converting means and the supporting means, wherein the condition expressed by $$100 < F < 400,$$

and $$2.76 \times 10^{-5} < t/l \{sin\phi - (\tfrac{1}{4}) sin2\phi - \pi\phi/360\} < 0.21,$$

is satisfied, where
- F (gf/mm) is the urging force per unit of contact length by which the pressing means urges the converting means,
- $\phi$ is the angle (°) defined in a plane perpendicular to said optical axis by a line connecting a point on said optical axis and a contact point between the reference surface and the converting means, and a line connecting said point on said optical axis and a point on an end portion of the bonding means, where
- l is the axial length (mm) of the converting means along the optical axis, and
- t is the length of the bonding means applied along the longitudinal axis of the converting means.

* * * * *